(No Model.)
F. DOUGLAS.
FOOT REST FOR BICYCLES.
No. 467,344. Patented Jan. 19, 1892.
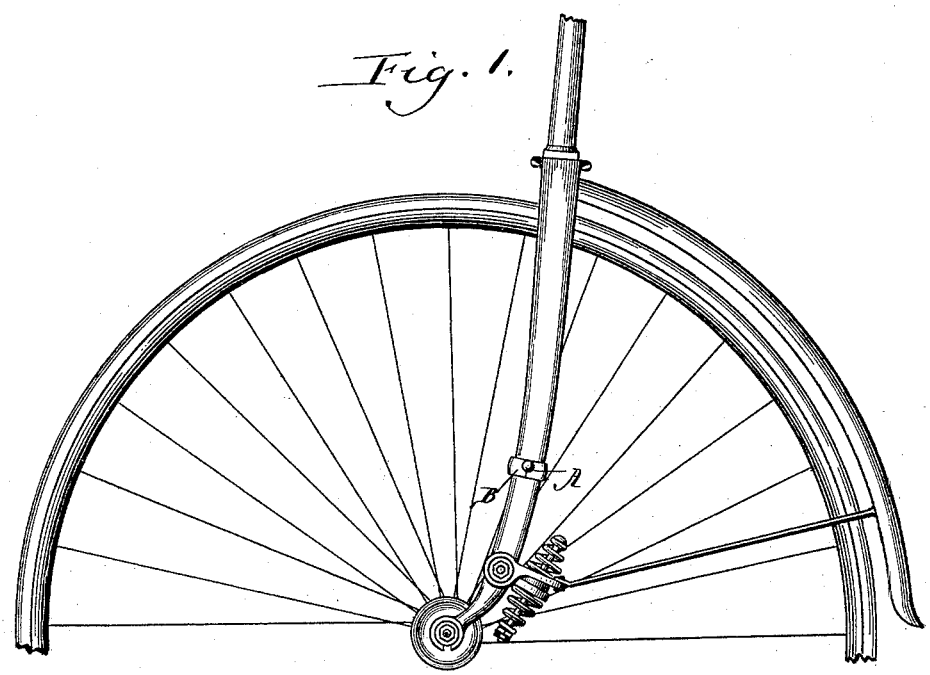
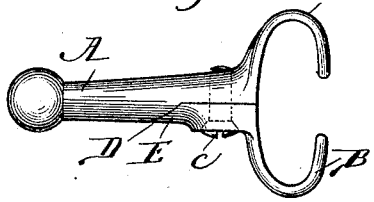
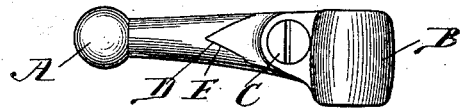
Witnesses
W. Rossiter
F. H. Mills
Inventor
Frank Douglas
By Banning & Banning
Payson, Att'ys.

UNITED STATES PATENT OFFICE.

FRANK DOUGLAS, OF CHICAGO, ILLINOIS.

FOOT-REST FOR BICYCLES.

SPECIFICATION forming part of Letters Patent No. 467,344, dated January 19, 1892.

Application filed August 31, 1891. Serial No. 404,237. (No model.)

*To all whom it may concern:*

Be it known that I, FRANK DOUGLAS, a citizen of the United States, residing at Chicago, State of Illinois, have invented a new and useful Improvement in Attachable and Detachable Coasters for the Front Forks of Bicycles, of which the following is a specification.

My invention has for its object a foot-rest or coaster that can be attached to any position, high or low, on the front forks of a bicycle, and which will be firmly held in its position when adjusted and secured to its place.

In the accompanying drawings, Figure 1 illustrates one half-section of a wheel with the front fork attached to its axle, showing the coaster fastened onto the front fork in a desirable position for the rider. Fig. 2 is a plan, and Fig. 3 is a side view of the coaster or foot-rest detached from the fork.

A is the solid or main portion of the coaster.

B is the detachable half or part.

C is the screw which holds the detachable part in its place.

D is the V-shaped notch cut back in the solid portion of the coaster A.

E is a corresponding V-shaped end to the detachable portion of the coaster B.

To remove a coaster from the fork, the screw C is removed from the solid part of the coaster A, thereby detaching the part B, which clamps it onto the back fork. To attach it to the bicycle-fork, the solid part A is placed in position and the removable part B, with its V-shaped end E, is placed in the V-shaped groove D, when the screw C is passed through the hole in the detachable part B, and screwed into the solid portion A, clamping the coaster firmly onto the front fork. When it is desired to raise or lower the coaster, a slight loosening of the screw C is all that is required, as the V end of the loose part D holds it in its true line and position for clamping or adjusting the coaster in its place. The V-shaped notch D, with the corresponding V-shaped end of the adjustable part B, serves as a pivoting-point for the outer bearing of the detachable part B and admits of a good fit and adjustment in various positions on a taper fork.

The outer end of this coaster is turned ball-shaped a little larger in diameter than the other portion of the coaster-arm and serves to hold the rider's foot from slipping off the coaster, and also makes a smooth round surface, which prevents injury to the rider.

Having thus described the nature and object of my invention, what I claim as new, and desire to secure by Letters Patent, is—

In a coaster for a bicycle, the combination of a main part provided with a V-shaped notch, a detachable part provided with a V-shaped end to enter such notch, and a screw passing through the parts to hold them together, substantially as described.

FRANK DOUGLAS.

Witnesses:
EPHRAIM BANNING,
SAMUEL E. HIBBEN.